May 31, 1960   A. H. CANADA ET AL   2,938,378
OPTICAL DYNAMOMETER
Filed Feb. 29, 1956                              2 Sheets-Sheet 1
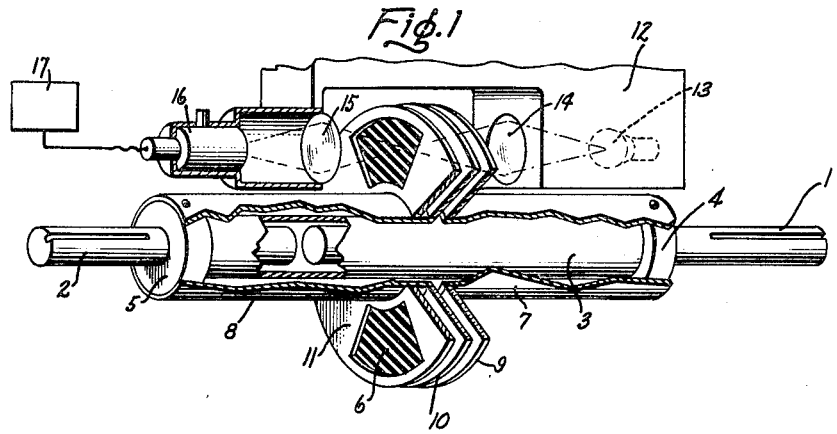
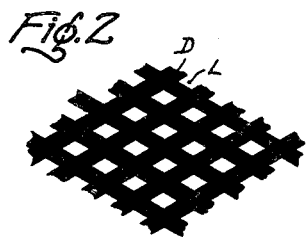
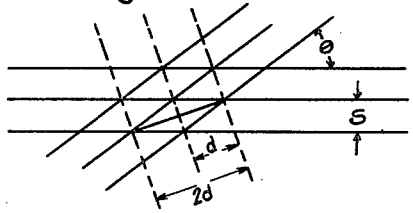
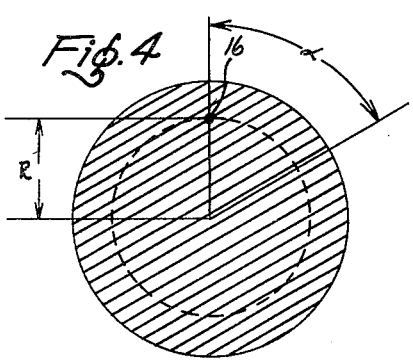
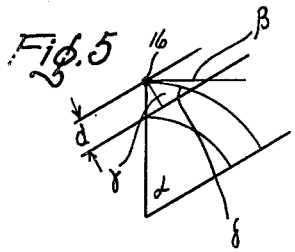
Inventors
Alfred H. Canada
Donald DeJager
by Merton D. Moore
Their Attorney May 31, 1960 A. H. CANADA ET AL 2,938,378
OPTICAL DYNAMOMETER
Filed Feb. 29, 1956 2 Sheets-Sheet 2
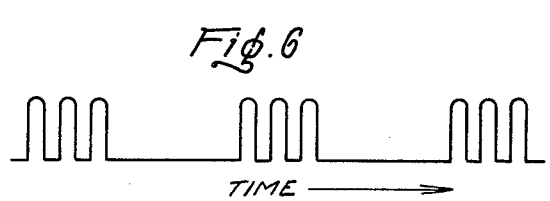
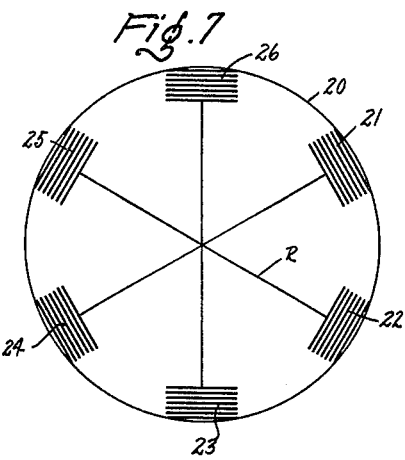
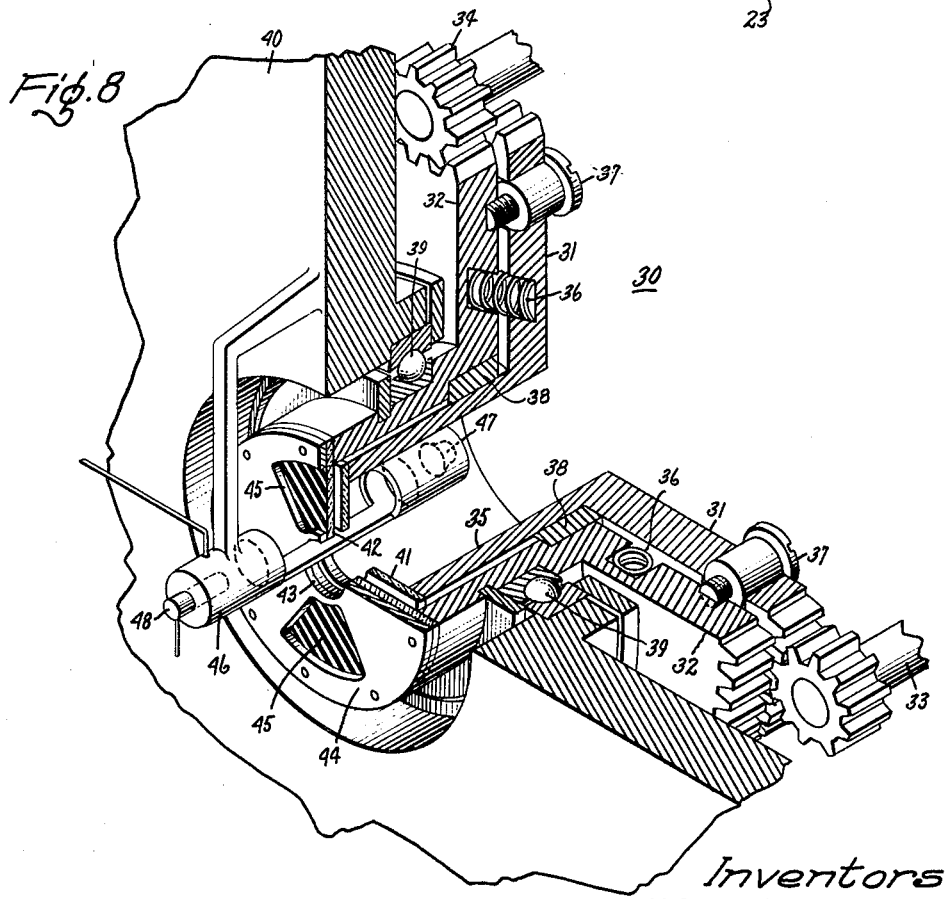
Inventors
Alfred H. Canada
Donald DeJager
by Merton D Nunn
Their Attorney United States Patent Office 2,938,378
Patented May 31, 1960

2,938,378

OPTICAL DYNAMOMETER

Alfred H. Canada and Donald de Jager, Schenectady, N.Y., assignors to General Electric Company, a corporation of New York Filed Feb. 29, 1956, Ser. No. 568,585

16 Claims. (Cl. 73—136)

This invention relates to an apparatus for measuring mechanical power transmitted by rotating elements. More specifically, it relates to an apparatus utilizing an optical system for directly measuring power.

The conventional approach to the measurement of horsepower contemplated the individual measurement of torque and speed and electrical circuit means to obtain their product as a measure of horsepower. It is characteristic of these prior art systems to utilize a torque measuring device either of the absorption or direct reading type to obtain an electrical signal representative of torque, and a tachometer to produce a signal representative of speed. That is, strain gages mounted in physical juxtaposition with the rotating power transmitting elements are actuated by the relative angular displacement of the rotating elements to produce a signal indicative of torque. The two discrete electrical signals were then multiplied in an electrical circuit and the product was a measure of the transmitted horsepower. As a consequence, these prior art devices are both complex and costly since separate measuring instruments to generate torque and speed signals, as well as electrical circuitry, are required to achieve the final measure of horsepower. Furthermore, since two electrical quantities, representing torque and speed, are multiplied in order to obtain horsepower, electrical instabilities in the multiplying circuitry lead to serious errors in the final readings.

It is an object of this invention, therefore, to provide a compact, direct reading power measuring apparatus having a minimum of external electrical circuitry.

Another object of this invention is to provide a direct reading, non-contacting, system for measuring horsepower delivered by a rotating element.

Yet another object of this invention is to provide a power measuring apparatus utilizing a modulated light beam.

Still another object of this invention is to provide a measuring device which provides an indication of the torque delivered as well as of the horsepower.

Briefly speaking, our invention contemplates modulating a light beam as a function of the delivered power, detecting the light modulation by means of a photoelectric device to produce a pulsating output signal, and measuring the frequency of the output pulsations from the photoelectric device to achieve a measure of the power delivered. To this end a pair of Ronchi ruled discs are attached to two distinct portions of a power delivering rotating element such as a shaft. A Ronchi ruling consists of a glass plate on which there are inscribed a large number of parallel lines having width equal to the spacing between them. When two Ronchi ruled plates or discs are angularly displaced with respect to each other a number of dark and light bands become visible the number per unit distance being a function of the angular displacement between the two plates. By attaching a pair of these Ronchi ruled discs to two distinct portions on a rotating element, these discs produce light and dark bands the number of which is a function of the torque applied to the rotating element. Furthermore, since these Ronchi ruled discs are attached to the rotating member the bands produced thereon rotate at the same speed as the rotating element. These moving bands are utilized to modulate a light beam which is intercepted by a photoelectric detector. The photoelectric detector produces a pulsating output the frequency of which is proportional to both the number of bands developed on the Ronchi ruled discs and the speed of rotation. By counting the number of electrical pulses per unit time it is possible to get an indication of power since the number of pulses per unit time indicates torque on the shaft times speed of rotation which is by definition power.

The novel features which we believe to be characteristic of our invention are set forth with particularity in the appended claims. Our invention itself, however, both as to its organization and method of operation, together with further objects and advantages thereof may best be understood with reference to the following description taken in connection with the accompanying drawing, in which:

Fig. 1 is a perspective view of an optical power measuring device embodying the instant invention;

Fig. 2 shows an enlarged sketch of the crossover pattern of two twisted Ronchi rulings which gives rise to the dark and light band pattern;

Fig. 3 is a detailed showing of a portion of Fig. 2 and illustrates the relationship of the light and dark bands to the angular displacement between two Ronchi rulings;

Fig. 4 illustrates the relationship between the band pattern developed by the apparatus of Fig. 1 and the scanning photoelectric device;

Fig. 5 is a detailed view of a portion of Fig. 4;

Fig. 6 is a graph showing the wave shapes of the photoelectric output signals;

Fig. 7 illustrates a Ronchi ruled disc having a number of discrete sections of Ronchi rulings;

Fig. 8 is a perspective view of an alternative embodiment of the invention.

Referring now to Fig. 1, there is shown an optical power measuring device embodying the principles of the instant invention as applied to a drive shaft. A driven member, such as the keyed shaft 1, is coupled to a prime mover, such as an electric motor or an internal combustion engine or any source of rotating mechanical power, and transmits this power to a driven member, such as the keyed shaft 2, through an elastic, deformable, torsional member 3. The torsional member 3 may be a torque tube or any similar torsionally deformable member. The torque tube 3 is fastened to the driving and driven shafts 1 and 2 by means of two shaft collars 4 and 5. As power is transmitted through the shafts 1 and 2, from the prime mover to the load, the torque tube 3 is torsionally deformed so that there is a relative angular displacement between the ends of the torque tube attached to the collars 4 and 5. This relative angular displacement of the torsional member is utilized, as will be explained in greater detail later, to indicate the amount of power transmitted by the shaft members.

Mounted on the power transmitting members and rotating therewith is a means for modulating a beam of light as a function of the power transmitted. Fastened onto the outer periphery of the shaft collars 4 and 5 are a pair of coaxial, cylindrical support members 7 and 8. Mounted on support members 7 and 8 respectively, are two parallel circular Ronchi ruled discs 9 and 10. The Ronchi ruled discs 9 and 10 each consists of a glass plate on which there is deposited a photographic emulsion.

Inscribed in the photographic emulsion are a large number of straight parallel lines whose width is equal to the spacing between them. Ronchi rulings having 175 lines per inch are not uncommon and rulings containing a greater number of lines per inch can, of course, be utilized. These discs are so positioned that in the absence of transmitted torque the parallel lines on one disc are parallel with those on the other. Since the Ronchi ruled discs 9 and 10 are connected respectively to the driving and driven shafts, any torque transmitted causes an angular displacement between these two discs which is representative of the torque. As is normal with two parallel Ronchi ruled discs, any relative angular displacement between these discs, as will be explained in greater detail later with reference to Figs. 2 and 3, produces a band pattern of alternately opaque and transparent portions. The number of these bands per unit distance is a function of the angular displacement between the discs which in turn is a function of the transmitted torque.

The band pattern produced by the Ronchi ruled discs is utilized to modulate a beam of radiant energy, the modulation taking place at the running speed of the rotating device. A photoelectric device detects the modulated beam and produces a pulsating output the frequency of which is a measure of horsepower. To this end, there is mounted within a stationary housing 12 a source of light 13 such as an incandescent lamp, or any other suitable source, to produce a narrow beam of light which is to be modulated by the band pattern of the Ronchi ruled discs 9 and 10. The light beam is projected by means of a lens system, including lenses 14 and 15, onto a photoelectric device 16 which may be either a photoelectric cell or a photomultiplier or any other light sensitive device. The stationary housing and the beam of light are so positioned that the beam is intercepted by the discs and modulated by the band pattern thereon. A counting or measuring device 17 is connected to the output of the photoelectric device 16 and determines the frequency of the output pulses and thus gives a measure of the delivered power. An opaque light interrupting or chopping means 11 having two sector shaped apertures 6 is attached to the cylindrical support member 8 and permits the modulated light to impinge on the photoelectric device twice during each rotation of the shaft members 1 and 2.

Referring now to Fig. 2, which shows a greatly enlarged view of the crossover pattern of two Ronchi rulings angularly displaced with respect to each other, each of the rulings consists of a number of parallel opaque lines D separated by light transparent spaces L which are of the same width as the lines D. The parallel lines D extending in one direction are those of one Ronchi ruled disc and those extending at an angle therewith are those of the other. The intersecting parallel lines D, having the relationships and dimensions described in relation to Fig. 2, produce generally vertical transparent and opaque bands, the transparent bands being the vertical rows of diamond areas in Fig. 2 and the opaque bands being the dark zigzag portions extending generally vertically between the transparent bands. These bands can best be seen by holding the plane of the paper at a small angle to the line of sight. The number of light and dark bands which are produced per unit distance is a function of the angular displacement between the Ronchi ruled discs and may be more clearly seen with reference to Fig. 3 which shows a detailed portion of Fig. 2.

In Fig. 3 the full lines represent the two sets of opaque intersecting lines in Fig. 2 and the dotted lines, here shown at an angle to the vertical, represent the vertical transparent lines of Fig. 2 comprising the vertical rows of diamond shaped areas. The angle $\theta$ between the two sets of full lines is the angular displacement between the two Ronchi rulings.

Assuming the line width and spacing of each Ronchi ruling to be S, as indicated in Fig. 3, and an angular displacement of $\theta$ between the two discs, there will appear a series of alternate transparent and opaque bands which are indicated by the dotted lines which show the position of the transparent bands. The relationship between the spacing of the bands, D, and the spacing of the lines of the Ronchi ruling, S and the angular displacement of the plate, $\theta$, is:

$$\sin \frac{\theta}{2} = \frac{S}{2d}$$

For small values of $\theta$, $$\sin \frac{\theta}{2} = \frac{\theta}{2}$$

where $\theta$ is given in radians. Since the angular displacement of the Ronchi ruled discs as used in a horsepower meter will never exceed 10 degrees or so, this approximation is accurate within 1%. Therefore, the formula can be restated as:

$$\frac{\theta}{2} = \frac{S}{2d} \text{ or } d = \frac{S}{\theta}$$

If we let $b$ equal the number of bands per inch, $b$ is equal to the reciprocal of the spacing of the bands, and:

$$b = \frac{1}{d}$$

Furthermore, since the number of lines per inch on the Ronchi ruled disc is constant for any given disc, the spacing, S, between the lines is constant. Thus, K, the number of lines per inch on the Ronchi ruled discs is equal to the reciprocal of the spacing, S, between the lines and may be defined as:

$$K = \frac{1}{S}$$

Substituting these terms into the formula, we derive the new form thereof which states:

$$b = K\theta$$

which shows that the number of transparent and opaque bands produced per unit length is a direct function of the angular displacement between the Ronchi ruled discs.

Since the Ronchi ruled discs are attached to the rotating members and rotate therewith, the bands will likewise rotate relative to the light beam and modulate the light beam at the running speed of the rotating device. Consequently, the number of pulses produced per unit time will then give a direct indication of the horsepower since it will indicate the product of torque and velocity per unit time which is, of course, horsepower.

Figs. 4 and 5 illustrate the relationship between the band pattern developed by the Ronchi ruled discs 9 and 10 and the photoelectric device 16 which scans these bands. The photoelectric device 16 is positioned at distance R from the center of the Ronchi ruled discs 9 and 10. The band pattern produced by the relative angular displacement of the two Ronchi ruled discs will have an angular disposition $\alpha$ with respect to the scanning photoelectric device 16 as can be most clearly seen with reference to Fig. 5. The repetition frequency of the pulsating signal from the photoelectric device 16, it is clear, will vary with the relative angular position of the photo tube and the transparent and opaque bands. Assuming a band spacing of $d$ inches, the length, $\delta$, of arc between bands at the position of the photo tube is approximately equal to $\beta$, the hypotenuse of the right triangle $\gamma$ . $\beta$ is found from the equation:

$$\beta = \frac{d}{\cos \alpha}$$

Thus;

$$\delta = \frac{d}{\cos \alpha}$$

as a very close approximation. Of course, this approximation breaks down when $\alpha$ is near 90°, but as will be seen later, this is unimportant. Defining the angle $\alpha$ in terms of angular frequency of shaft rotation;

$$\alpha = \omega t$$

where $\omega$ equals frequency of shaft rotation in radians per second. Consequently $\delta$ may be found from:

$$\delta = \frac{d}{\cos \omega t}$$

The linear velocity of a point of a circle of a radius R, and consequently the linear velocity of the bands passing the photoelectric device, may be found from:

$$V = \omega R$$

Consequently the time necessary to scan one band interval by means of the photoelectric device 16 can then be found from:

$$t' = \frac{\delta}{V}$$

and the frequency with which the bands go past the photoelectric device will be the reciprocal of that, or:

$$f' = \frac{1}{t'}$$

Combining all of the equations:

$$f' = \frac{1}{t'} = \frac{V}{\delta} = \frac{\omega R \cos \omega t}{d} = \omega Rb \cos \omega t = \omega RK\theta \cos \omega t$$

This equation indicates the frequency with which the bands go past the photoelectric device 16 in terms of the angular displacement $\theta$ of the Ronchi discs and consequently the frequency of the pulses which will appear in the output of the photoelectric device. It can be seen from this formula that at a series of discrete points the frequency of scan hits maximum and minimum values. That is, when the angle $$\omega t = \frac{\pi}{2}, \frac{3\pi}{2}, \frac{5\pi}{2}, \text{etc.}$$

radians the frequency at which the bands go past the photocell, and consequently the frequency of the pulsating output, drops to zero since the cosine of these angles equals 0. In a similar fashion at the angles $0, \pi, 2\pi$, etc. radians the frequency $f'$ will have its maximum value since the cosine of those angles is equal to 1. Thus;

$$f' \max = \omega RF\theta$$

Expressing the angular velocity, radians per second, in terms of r.p.m.:

$$\omega = \frac{\text{r.p.m.}}{9.55}$$

since it is well known that 1 radian per second = 9.55 r.p.m. Substituting into the formula for $f'$ max, the equation takes the form:

$$f' \max = \frac{\text{r.p.m.} \ RK\theta}{9.55}$$

However;

$$\theta = mT + \theta_0$$

where T equals shaft torque and $m$ and $\theta_0$ are constants. $\theta_0$ represents an angular misalignment between the Ronchi ruled discs 9 and 10 which causes band patterns to appear with zero torque on the shaft. Hence:

$$f' \max = \frac{\text{r.p.m.}}{9.55} \cdot R.K.mT + \frac{\text{r.p.m.}}{9.55} \cdot R.K.\theta_0$$

The term:

$$\frac{\text{r.p.m.}}{9.55} \cdot R.K.mT$$

will indicate the shaft power since our definition:

$$\text{r.p.m.} \cdot \text{torque} = \text{power}$$

It can be seen, therefore, that the pulsating output of the photoelectric device 16 will vary in frequency depending on the relative angle $\alpha$ between the bands and photoelectric device even though constant torque is applied. It can further be seen that the maximum frequency produced gives an indication of the power delivered by the rotating element. By reading only the peak frequency an accurate measure of the transmitted power may be obtained. To this end, the light chopper 11 having apertures 6 is positioned between the Ronchi ruled discs 9 and 10 and the photoelectric device 16. In this fashion the light beam modulated by the band pattern is allowed to impinge on photoelectric device twice every revolution for a small portion of the rotational cycle when $\alpha$ is very near to 0 and 180 degrees. Thus there will be produced in the output of the photoelectric device a series of pulsating signals, illustrated in Fig. 6, of nearly constant frequency which are periodically interrupted due to the action of the light chopping wheel 11. The repetition frequency of these pulses will then indicate the horsepower transmitted by the rotating element. By connecting the output of the photoelectric device 16 to a frequency measuring device 17 of any suitable type, a measure of the frequency of the pulsating signals may be achieved to indicate delivered power. The output of this frequency measuring device can, of course, be calibrated directly in terms of horsepower because of the direct relationship between the frequency and horsepower.

It is possible to eliminate the light chopper shown in Fig. 1 by utilizing a scalar counter connected to the output of the photoelectric device. Counts per unit time of the scalar counter would give an indication of the shaft horsepower, as counts per revolution would be a measure of the torque. Such pulse counters are especially useful where pulsating loads are to be measure or where it may be necessary to operate control equipment from the output of the horsepower measuring device.

An alternative approach to reading out $f'$ max without utilizing a light chopping device is embodied in the sectional Ronchi ruled disc illustrated in Fig. 7. By using a disc containing a number of discrete Ronchi ruled segments, and by positioning them properly, the frequency of $f'$ with which the bands go past the photoelectric device may be made more constant. The modified Ronchi ruled disc consists of a circular glass plate 20 having a photographic emulsion deposited thereon. Inscribed in the photographic emulsion are six circumferentially spaced Ronchi ruled sections 21, 22, 23, 24, 25, and 26, although more or less sections may be utilized, each of which consists of a number of parallel lines whose width is equal to the spacing between them. The individual sections 21, etc., are inscribed so that the lines of each section are normal to one radial line R of the disc 20. It is clear, however, that while all of the lines in a given section are parallel to each other, they will not necessarily be parallel to lines in the other sections. It can also be seen that the sections may be positioned so that the angle $\alpha$ (or $\omega t$) which the bands produced by each section make with the photoelectric device is always very close to 0 or $\pi$ radians, thus permitting a reading of $f'$ max without utilizing a light chopping device.

In an alternative embodiment, illustrated in Fig. 8, the principles of this invention are applied to measure the power transmitted by an idler gear arrangement. A split idler gear 30, comprising two gear members 31 and 32, is driven by a prime mover, not shown, through the shaft and drive pinion 33, and in turn drives a follower gear 34. Each of the gear members 31 and 32 consists of a circular toothed portion and a cylindrical, hollow, central stem portion 35 coaxial with the axis of rotation of the gear. The gear members 31 and 32 are torsionally coupled by means of angled spring members 36 which, when torque is applied to them, are compressed and transfer the torque. The two gear members are held together by means of the fastening member 37 which is rigidly fastened to gear 32 and extends through a slot in the gear member 31 to permit relative rotation of the members while yet fastening them together. A sleeve bearing 38 is positioned between the gear members to permit relative rotation therebetween while a ball bearing 39 is positioned between the gear member 32 and a stationary frame 40 to permit rotation of the gear with respect to the frame. Fastened to the end of the hollow, central portion 35 of the gear members 31 and 32 are a pair of circular, parallel Ronchi ruled discs 41 and 42 having circular cutout central portions 43. A circular light interrupting means 44 having two apertures 45 is also fastened to the gear member 34.

Any angular displacement between the gear members 31 and 32, due to power transmitted, will produce a concomitant angular displacement between the Ronchi ruled discs 41 and 42 which will produce the characteristic opaque and transparent band pattern. The band pattern is again used to modulate a light beam and produce a series of pulsating output signals which are a measure of the transmitted power. To this end, a stationary housing 46 fastened to the frame 40 is provided extending through the circular cutout portion 43 of the Ronchi ruled discs and extending into the stem portion 35 of the gear section 32. Contained within the stationary housing is a source of light 47, such as an incandescent lamp, to produce a beam of light. An optical relaying system consisting of two lenses focusses this light beam on a photoelectric device 48. The Ronchi ruled discs are so positioned as to intercept this light beam and modulate it by means of the light and dark band pattern produced thereon to produce a pulsating output in the photoelectric service, the frequency of which, as has been explained previously, is a measure of the transmitted power.

In operation, the prime mover, through the pinion gear 33, transmits power to the gear members 31 and 32 and in turn to the follower gear 34 through the angle D springs 36. The torque transmitted from the prime mover to the load causes an angular displacement between the gear members 31 and 32 and in turn cause an angular displacement between the Ronchi ruled discs 41 and 42 attached to these gears. This produces the characteristic band pattern of the Ronchi ruled discs which is utilized to modulate the light beam produced by the light source 47 and produces in the output of photoelectric device 48 a pulsating voltage the frequency of which is a measure of the power transmitted to the spring loaded split idler gear. The light interrupting device 44 and its apertured portion 45, as was explained in detail with reference to Fig. 1, ensures that only the peak frequency $f'$ max is read out.

In describing the application of Ronchi ruled discs to power measuring, it has been assumed for purposes of explanation, that at zero torque there would be no angular displacement between the discs and consequently no band pattern. It may be desirable, however, to provide in certain circumstances an angular offset and consequent band pattern at zero torque. That is, since the prime mover and the load, representing inertias, are connected by torsional members it is possible that torsional oscillations may occur. In order to obtain the correct average reading in such cases it is necessary that negative torque be indicated as such. Therefore, unless the equipment is very smooth running the discs should be offset by an amount equal to the full torque rating of the shaft. Thus, should torsional oscillations occur the negative torque would be indicated and a correct average reading would be obtained.

Although the ruled discs producing the band pattern have been described, in the preferred embodiment, as consisting of a series of parallel lines whose width is equal to the spacing between them, it is possible to utilize discs in which this particular relationship of line width and spacing is not utilized. That is, the spacing may be greater than the line width and still produce the opaque and transparent pattern upon angular displacement of the discs. Consequently such a modified ruling may be utilized to carry out the principles of the invention since it falls within the true spirit and scope thereof.

While we have shown particular embodiments of our invention it will, of course, be understood that we are not limited thereto since many modifications both in the circuit arrangement and in the instrumentalities employed may be made. We contemplate by the appended claims to cover any such modifications as fall within the true spirit and scope of our invention.

What we claim as new and desire to secure by Letters Patent of the United States is:

1. A direct power measuring apparatus for rotating power transmitting devices comprising, means to form a beam of radiant energy, radiant energy sensitive means positioned to intercept said beam and produce an electrical output in response thereto, and means to modulate the beam at the running speed of the rotating devices and including means to interrupt the beam during each revolution of the rotating device at a rate varying with torque whereby the electrical output from said radiation sensitive device is a pulsating signal the repetition frequency of which is a measure of the transmitted power.

2. In an apparatus for measuring mechanical power transmitted by a rotating element, the combination comprising means for forming a beam of light, torque responsive means having a multiplicity of transparent and opaque portions the number of which vary with said torque and connected to said rotating element to interrupt said light beam at a frequency proportional to transmitted power, photoelectric means to intercept said light beam to produce pulsating signals the repetition frequency of which is a measure of the power transmitted.

3. In an apparatus for measuring mechanical power transmitted through a rotating element, the combination comprising means for forming a beam of light, torque responsive means having a multiplicity of linear transparent and linear opaque portions the number of which vary with said torque connected to said rotating element to modulate said light beam, photoelectric means to intercept said modulated light to produce pulsating signals that are a measure of the transmitted power, apertured light interrupting means connected to said rotating means and positioned between said torque responsive and said photoelectric means to interrupt said light beam periodically.

4. In an apparatus for measuring power transmitted by a rotating element, the combination comprising means for forming a beam of light, torque responsive means connected to said rotating element to modulate said light, said torque responsive means having transparent and opaque portions the number of which varies with the torque, photoelectric means to intercept said modulated light beam to produce pulsating output signals whose frequency is a measure of the transmitted power, and frequency measuring means connected to the photoelectric device to indicate the transmitted power.

5. In an apparatus for measuring power transmitted by a rotating element, the combination comprising a means for forming a beam of light, two parallel Ronchi ruled discs connected to said rotating element to provide a band pattern of alternate opaque and transparent portions upon relative angular displacement of said discs due to transmitted torque, said discs being positioned to modulate said light beam, photoelectric means to intercept said modulated light beam to produce pulsating output signals whose frequency is a measure of transmitted power.

6. In an apparatus for measuring power transmitted by a rotating element, the combination comprising a means for forming a beam of light, two parallel Ronchi ruled discs connected to said rotating element producing a band pattern of alternate opaque and transparent portions upon torque induced angular displacement of said discs, said discs, being positioned to modulate said light beam, photoelectric means to intercept said modulated light beam to produce pulsating output signals whose frequency is a measure of transmitted power, and frequency measuring means connected to the photoelectric device to indicate the transmitted power.

7. In an apparatus for measuring power transmitted by a rotating element, the combination comprising a means for forming a beam of light, two parallel Ronchi ruled discs connected to said rotating element to produce a band pattern of alternate opaque and transparent portions as a result of torque induced angular displacement of said discs, said discs being positioned to modulate said light beam, photoelectric means to intercept said modulated light beam to produce pulsating output signals whose frequency is a measure of transmitted power, apertured light interrupting means fastened to said rotating means and positioned between said discs and said photoelectric device, and frequency measuring means connected to said photoelectric device to indicate the transmitted power.

8. In an apparatus for measuring mechanical power transmitted by a rotating element, the combination comprising means for forming a beam of light, a light responsive device to intercept said beam and produce an electrical output in response thereto, and means positioned to modulate said beam in response to the mechanical power transmitted by said rotating element to produce a single pulsating electrical output from said light responsive device the frequency of which is a measure of the transmitting power, said last named means including a torque responsive beam modulator to interrupt said beam during each revolution of said rotating element at a rate varying with the transmitted torque.

9. In an apparatus for measuring power transmitted by a first driving rotating element to a second driven rotating element, the combination comprising means for forming a beam of light, a first Ronchi ruled disc connected to said first rotating element, a second Ronchi ruled disc connected to said second rotating element, said first and second Ronchi ruled discs producing a band pattern of alternate opaque and transparent portions as a result of torque induced relative angular displacement and being positioned to modulate said light beam thereby, photoelectric means to intercept said modulated light beam to produce pulsating output signals whose frequency is a measure of the transmitted power.

10. In an apparatus for measuring horsepower, the combination comprising first and second rotating shaft members coupled by a deformable torsional member, a Ronchi ruled disc connected to said first shaft, a second Ronchi ruled disc connected to said second shaft whereby said Ronchi ruled discs produce a torque induced band pattern of alternate opaque and transparent portions, means to produce a beam of light which is modulated by said Ronchi ruled discs, and photoelectric means to intercept said modulated light beam to produce output pulses whose frequency is an indication of the delivered horsepower.

11. In an apparatus for measuring horsepower, the combination comprising first and second rotating shaft members coupled by a deformable torsional member, two parallel Ronchi ruled discs mounted on said first and second shafts respectively to produce a band pattern due to the torque induced angular displacement, a stationary housing having mounted therein a light beam producing means, an optical relaying system for said light beam and a photoelectric device upon which the light beam impinges, said Ronchi ruled discs being positioned to intercept and modulate said light beam to produce output pulses from said photoelectric device the frequency of which is a measure of the transmitted power.

12. In an apparatus for measuring horsepower, the combination comprising first and second rotating gear members coupled by compressible spring members, two Ronchi ruled discs mounted on said first and second gear members so as to be in parallel relationship and produce a band pattern due to the torque induced angular displacement, means to produce a beam of light which is modulated by said Ronchi ruled discs, and photoelectric means to intercept said modulated light beam to produce output pulses whose frequency is an indication of the transmitted power.

13. In an apparatus for measuring horsepower, the combination comprising first and second rotating gear members coupled by angled compressible spring members, two parallel Ronchi ruled discs mounted on said first and second gear members so as to produce a band pattern of alternate opaque and transparent portions due to the torque induced angular displacement of said discs, a stationary housing having mounted therein a light beam producing means, an optical relaying system for said light beam, and a photoelectric device upon which said light beam impinges, said Ronchi ruled discs being positioned to intercept and modulate said light beam to produce output pulses from said photoelectric device the frequency of which is a measure of the transmitted power.

14. In an apparatus for measuring mechanical power transmitted between a first and second rotating elements, the combination comprising two Ronchi ruled discs connected to said first and second rotating elements, each of said discs comprising a light transparent plate having a plurality of discrete inscribed portions containing a multiplicity of parallel opaque lines separated by a distance substantially equal to the width of said lines, means to produce a beam of light which is modulated by said Ronchi ruled discs, and photoelectric means to intercept said modulated light beam to produce a pulsating output the frequency of which is a measure of delivered power.

15. In a device for measuring torque transmitted between two elements, the combination of a first Ronchi ruled disc connected to one of said elements, a second Ronchi ruled disc connected to the other of said elements and positioned in parallel to said first disc, whereby a torque induced relative angular displacement of said discs occurs to produce a band pattern of alternate opaque and transparent portions which are a measure of the torque.

16. In an apparatus for measuring mechanical power transmitted between first and second rotating elements, the combination comprising two Ronchi ruled discs connected to said first and second rotating elements, each of said discs comprising a light transparent plate having a plurality of discrete inscribed circumferentially spaced portions containing a multiplicity of parallel opaque lines separated by a distance substantially equal to the width of said lines, means to produce a beam of light which is modulated by said Ronchi ruled discs, and photoelectric means to intercept said modulated light beam to produce a pulsating output, the frequency of which is a measure of delivered power.

References Cited in the file of this patent
UNITED STATES PATENTS

| Number | Name | Date |
|---|---|---|
| 1,800,044 | Baird | Apr. 17, 1931 |
| 2,136,223 | Thomas | Nov. 8, 1938 |
| 2,246,002 | Powers | June 17, 1941 |
| 2,256,170 | Powers | Sept. 16, 1941 |
| 2,280,038 | Powers | Apr. 14, 1942 |
| 2,313,923 | Chubb | Mar. 16, 1943 |
| 2,402,719 | Allison | June 25, 1946 |
| 2,541,437 | Prescott | Feb. 13, 1951 |
| 2,586,540 | Holden | Feb. 19, 1952 |
| 2,589,421 | Morrison | Mar. 18, 1952 |
| 2,813,460 | Wallin | Nov. 19, 1957 |